Figure 1A:
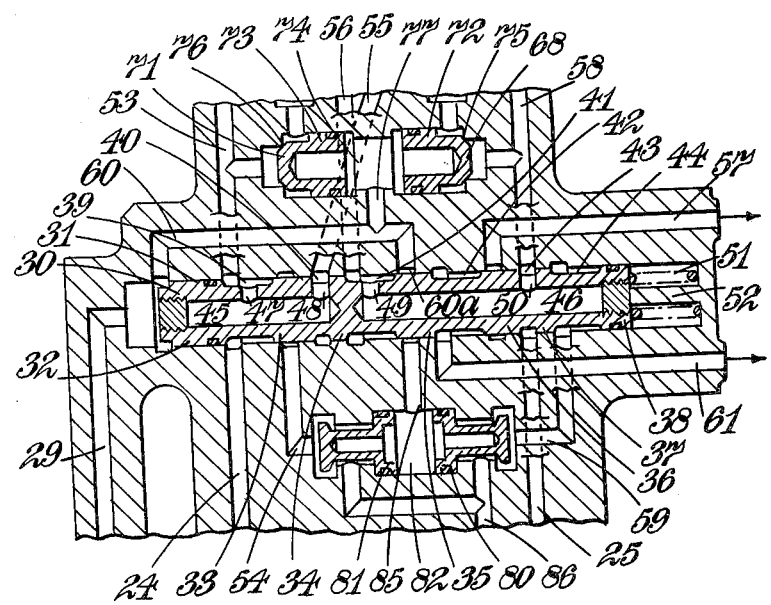

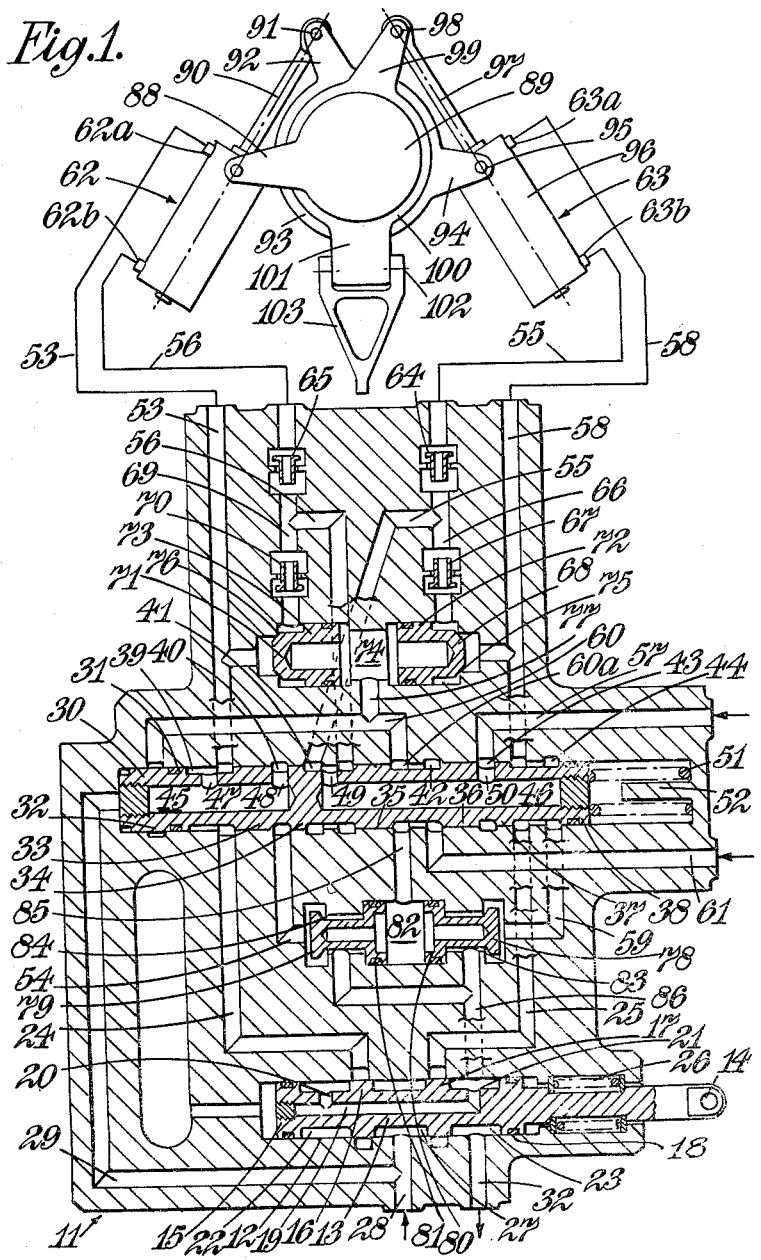

Jan. 30, 1962     A. CAMERON-JOHNSON     3,018,986

FLUID OPERATED MECHANISM FOR STEERABLE AIRCRAFT WHEELS

Filed Sept. 12, 1960     3 Sheets-Sheet 2

Jan. 30, 1962 A. CAMERON-JOHNSON 3,018,986
FLUID OPERATED MECHANISM FOR STEERABLE AIRCRAFT WHEELS
Filed Sept. 12, 1960 3 Sheets-Sheet 3

United States Patent Office 3,018,986
Patented Jan. 30, 1962

3,018,986
FLUID OPERATED MECHANISM FOR STEERABLE AIRCRAFT WHEELS
Alan Cameron-Johnson, Gloucester, England, assignor to Dowty Rotol Limited, Gloucester, England
Filed Sept. 12, 1960, Ser. No. 55,451
Claims priority, application Great Britain Sept. 17, 1959
11 Claims. (Cl. 244—50)

This invention relates to fluid operated mechanisms.

According to this invention there is provided a mechanism having two jack means, the first of which is intended for moving an angularly displaceable device to one side of a mean position and the second of which is intended for moving the device to the other side of its mean position and having three coaxially mounted elements which connect the jacks to the device, one of the elements being angularly displaceable about its axis and being connected at spaced points off-set from its axis to the angularly displaceable device and pivotally to one of the relatively movable parts of the first jack means, a second of the elements being angularly displaceable about its axis and being pivotally connected at spaced points off-set from its axis to the other of the relatively movable parts of the first jack means and to one of the relatively movable parts of the second jack means, the third element being fixed and being pivotally connected at a point off-set from its axis to the other of the relatively movable parts of the second jack means, and the first and second jack means having the axes of their movable parts tangential to the same or different circles, coaxial with the axis of the three elements and, when the angularly displaceable device is in its mean position, being in their extended positions. Preferably both jack means are double-acting hydraulic piston and cylinder devices.

Control means for a mechanism as set forth above may comprise a first duct adapted to be connected with a source of fluid pressure, a second duct adapted to be connected with a drain source, a third duct connected to one end of the cylinder of said first piston and cylinder device, a fourth duct connected to the other end of the cylinder of said first piston and cylinder device, a fifth duct connected to one end of the cylinder of said second piston and cylinder device, a sixth duct connected to the other end of the cylinder of said second piston and cylinder device, and control valve means between said first and second ducts on the one hand and said third, fourth, fifth and sixth ducts on the other hand, which control valve means is movable between two positions in one of which it permits connection between said first duct and said third and sixth ducts and between said second duct and said fourth and fifth ducts and in the other of which it permits connection between said first duct and said fourth and fifth ducts and between said second duct and said third and sixth ducts; the arrangement being such that when the pressure in said third and sixth ducts exceeds the pressure in said fourth and fifth ducts, said first piston and cylinder device tends to move said first sleeve round said shaft in the same direction as said second piston and cylinder device tends to move said second sleeve round said first sleeve. The control means may further comprise a first cross connection between said third duct and said fourth duct, a second cross connection between said fifth duct and said sixth duct, a pair of fluid flow restriction means one in each of said cross connections, and isolating valve means movable between a first position in which it closes both said cross connections and permits said first and second ducts to be connected through said control valve means with said third, fourth, fifth and sixth ducts and a second position in which it opens said cross connection and isolates said first and second ducts from said third, fourth, fifth and sixth ducts.

Preferably each of said restriction means comprises a pair of one-way flow restrictors spaced apart along the cross connection and arranged each to restrict flow towards the other, and said control means further comprises a seventh duct adapted to be connected to a source of fluid pressure and connected through said isolating valve means with both said cross connections between the one way flow restrictors, the arrangement being such that when said isolating valve means is in its first position said seventh duct is isolated from said cross connections and when said isolating valve means is in its second position said seventh duct is in fluid communication with said cross connections.

Preferably the control means comprises an eighth duct adapted to be connected to a source of fluid pressure and connected through said isolating valve means with said third and fifth ducts, said isolating valve means being movable to a position in which said eighth duct is in fluid communication with said third and fifth ducts and said second duct is in communication with said fourth and sixth ducts.

Preferably the isolating valve means comprises a two-position change-over valve, a pressure operated device connected to said change-over valve to move it from a first position to a second position and connected to be operated by pressure in said first duct, and biasing means biasing said change-over valve to its first position, the arrangement being such that said change-over valve in its second position connects said control valve means with said third, fourth, fifth and sixth ducts. The isolating valve means may further comprise a pair of by-pass valves one in each of said cross connections and movable between first positions in which each shuts off its cross connection and second positions in which each opens its cross connection, by-pass pressure operated means connected with said by-pass valves to move said by-pass valves from their second positions to their first positions and connected with said change-over valve, the arrangement being such that when said change-over valve is in its first position said by-pass pressure-operated means is connected with said eighth conduit and when said change-over valve is in its second position said by-pass pressure-operated means is connected with said first conduit. The isolating valve means may still further comprise drain ducting leading from said second duct to said change-over valve and put in fluid communication with said fourth and sixth ducts when said change-over valve is in its first position, stop valve means in said drain ducting urged towards closure by fluid pressure in said fourth and sixth conduit, a further pressure operated means connected to said stop valve means to move said stop valve means to open position and in fluid connection through said change-over valve when it is in its first position with said eighth conduit.

The angularly displaceable device may be an axle for receiving a wheel or wheels, the fixed one of the three coaxially mounted elements being a support for the axle, the axle being capable of movement relative to the fixed element.

The invention also provides an aircraft supporting leg having a wheel or wheels which are more angularly displaceable to one side or to the other side of a mean position for the purpose of steering the aircraft, the wheel or wheels having an axle constituting an angularly displaceable device as aforesaid and a mechanism as set forth above for rotating the axle to steer the aircraft.

Figure 2:
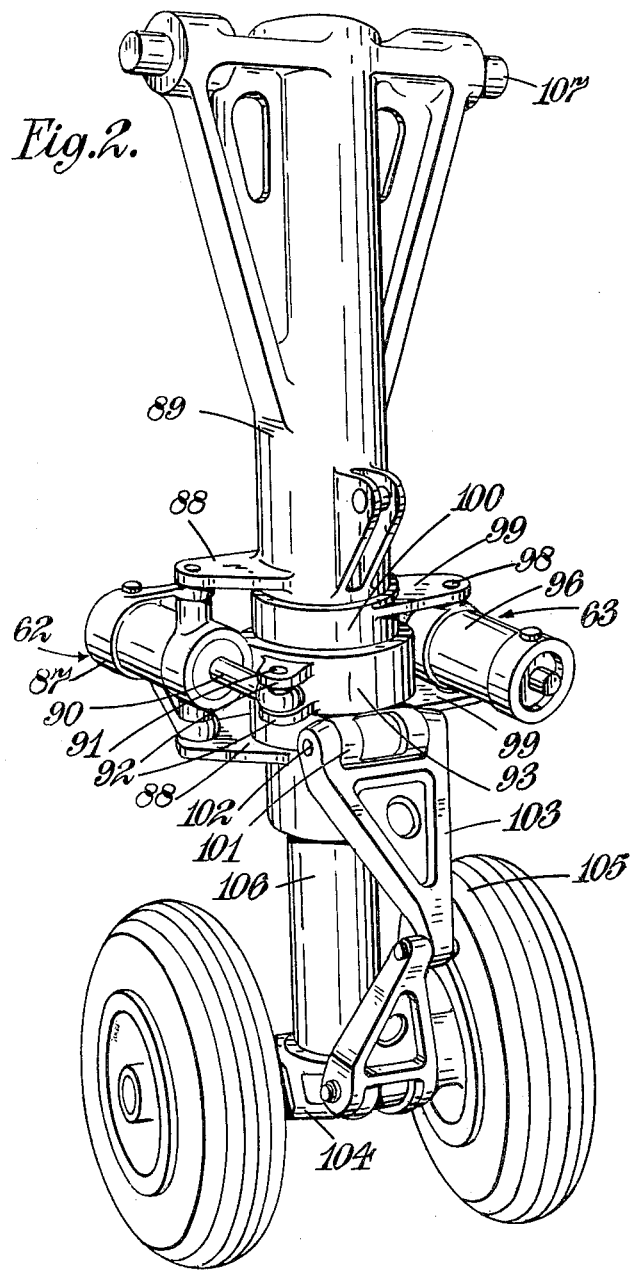

One embodiment of the invention will now be described by way of example with reference to the accompanying drawings in which:

FIGURE 1 is a diagrammatic cross-sectional representation of the control system of an aircraft steerable nose-wheel according to the invention, FIGURE 1A is a diagrammatic cross-sectional scrap view of a part of the control system shown in FIGURE 1, to illustrate a particular phase of operation, and FIGURE 2 is an external view of the complete nose-wheel assembly.

Referring now to the drawings, in FIGURE 2 there is shown a typical nose-wheel assembly embodying the invention. The undercarriage assembly comprises a fixed strut 89 and a coaxial movable strut 106. At the end of the strut 106 remote from strut 89 an axle unit 104 is provided. This unit 104 carries twin nose-wheels 105. The axle unit 104 is steerable about its axis by a conventional scissors arrangement as shown at 103. The strut 89 has a first pair of axially spaced radially extending arms 88 fixed thereto. Pivotally mounted between these arms 88 is a cylinder 87 of a first piston and cylinder device 62. The piston rod 90 of the first piston and cylinder device 62 is pivoted to a second pair of axially spaced arms 92 projecting radially from a first sleeve 93 which is rotatably mounted on the strut 89. A third pair of axially spaced arms 94 (not shown in FIGURE 2) also project radially from the first sleeve 93. To these arms 94 is pivoted the piston rod 97 of a second piston and cylinder device 63. The cylinder 96 of the second piston and cylinder device 63 is pivoted to a fourth pair of axially spaced arms 99 at 98. These arms 99 project radially from a second sleeve 100 rotatably mounted on the strut 89. The scissors linkage 103 is connected to the second sleeve 100, being pivoted to a lug 101 at 102.

The strut 89 is provided with trunnions 107 so that it may be pivoted relative to the aircraft from an extended to a retracted position and vice versa.

In FIGURE 1 the arrangement described with reference to FIGURE 2 is shown diagrammatically. There is however a slight difference between this arrangement and the arrangement of FIGURE 2 in that in the second piston and cylinder device 63 the cylinder 96 is connected to the third pair of arms 94 and the piston rod 97 is connected to the fourth pair of arms 99. Further description of the invention will be with reference to FIGURE 1 because the relative simplicity of the diagrammatic illustration will facilitate the understanding of this arrangement.

The strokes of the two piston and cylinder devices 62 and 63 are substantially the same. When these devices 62 and 63 are fully extended, it will be seen that the second sleeve 100 and the scissors device 103 will be in a predetermined position, which is intermediate the two extreme positions of the scissors device 103 relative to the fixed strut 89 and which is arranged for convenience to be the central position of the nose-wheel assembly. It will also be seen that contraction of the first piston and cylinder device 62 will cause the first sleeve 93 to move in an anticlockwise direction about the fixed strut 89 and due to the substantially solid connection between the first sleeve 93 and the second sleeve 100 through the second piston and cylinder device, the scissors linkage 103 will be moved in an anti-clockwise direction about the axis of the strut 89. Similarly with the parts in position as shown in FIGURE 1, should the second piston and cylinder device 63 contract the pair of arms 99 on the second sleeve 100 will move in a clockwise direction towards the pair of arms 94 on the first sleeve 93. As the first sleeve is substantially fixed relatively to the fixed strut 89 through the first piston and cylinder device 62 the scissors linkage 103 will move clockwise relative to the fixed strut 89.

It will be seen that as the pairs of arms 88 and 92 upon the one hand and 94 and 99 on the other hand approach each other the line of action through which the first and second piston and cylinder devices 62 and 63 respectively act will become more distant from the axis about which the sleeves 93 and 100 rotate. Thus the torque produced as a result of constant effort in the piston and cylinder devices tends to increase with increasing angular displacement of the sleeve 100 from its intermediate position as shown in FIGURE 1.

Movement of the piston and cylinder devices 62 and 63 is under the control of a control means indicated generally by the reference numeral 11. The control means 11 is adapted to be connected to a source of high-pressure fluid through a first duct 28 as will be hereinafter described and to a drain through a second duct 32. The control means 11 is connected to the first piston and cylinder device 62 through third and fourth ducts 56 and 53 respectively and to the second piston and cylinder device 63 through fifth and sixth ducts 55 and 58, respectively.

The control means 11 comprises a control valve means in the form of a steering selector spool 13 and an isolating valve means. The steering selector valve spool 13 is mounted for reciprocation in a first valve bore 12 and is provided with a pivot 14 by which it is connected through a linkage (not shown) to the pilot's manual steering control in the aircraft cockpit. The isolating valve means comprises a two position changeover valve 30; a pair of by-pass valves 68 and 71; a pair of stop valves 78, 79 and two pairs of one way restrictors 64, 67, 65 and 70. The construction, location and operation of the steering selector spool 13; the two position change-over valve means 30; the pair of by-pass valves 68 and 71; the pair of stop valve means 78, 79 and the two pairs of one way restrictors 64, 67, 65 and 70 will be hereinafter described.

The first and second ducts 28 and 32 lead into the first valve bore 12 at axially spaced locations. Two further ducts 24 and 25 lead from this bore 12. The steering selector spool 13 is provided with lands 15, 16, 17 and 18 of which land 15 at the end of the steering selector spool 13 is most remote from the pivot 14 and land 18 is nearest pivot 14. The lands 16 and 17 are located so that when the steering selector spool is in the neutral position (as shown in FIGURE 1) they close off the openings from ducts 24 and 25 and the annulus 27 between these lands is connected to the first duct 28. The lands 17 and 18 are spaced so that the annulus 23 formed between them, when the steering selector spool 13 is in the neutral position, is connected to the second duct 32. The steering selector spool 13 is also provided with an internal axial bore 19 and radial connecting bores 20 and 21 to place the annulus 21 formed between the lands 15 and 16 in communication with the annulus 23. A centering spring 26 acts on the steering selector spool 13 to maintain it in its neutral position.

A two position change-over valve means 30 is contained within a second valve bore 31. A duct 29 leads from the first duct 28 to one end of the bore 31 (the left hand end in FIGURE 1) so that one end of the two position change-over valve means 30 is subjected to the pressure in the first duct means 28 and acts as an hydraulic piston. A spring 51 acts on the other end of the two position change-over valve 30 to bias the two position change-over valve 30 in the opposite direction. When the pressure in duct 29 is less than operating pressure the two position change-over valve 30 will be urged by spring 51 to take up the position shown in FIGURE 1 herein referred to as the first position of the two position change-over valve. When the pressure in the first duct 28 and hence duct 29 reaches operating pressure, the force on the valve 30 due to the pressure in duct 29 will overcome the force due to the spring 51 and the valve will be moved until it abuts a stop 52 provided to limit movement of the two position change-over valve 30. The position then taken up by the valve 30 is as shown in FIGURE 1A and is hereinafter referred to as the second position of the valve 30. The two position change-over valve 30 is provided with axially spaced lands 32, 33, 34, 35, 36, 37 and 38, and intervening annuli 39, 40, 41, 42, 43 and 44. The two position change-over valve 30 is also provided with two separate axial bores 45 and 46. Axial bore 45 is provided with two radial bores 47 and 48 whereby annuli 39 and 40 are placed in communication. The bore 46 is provided with radial bores 49 and 50 whereby annuli 41 and 43 are placed in communication.

The ends of the ducts 24 and 25 remote from the selector spool 13 enter the bore 31 at axially spaced locations. The fourth duct 53 enters the bore 31 at a position opposite the duct 24 and the sixth duct 58 enters the bore 31 at a position opposite the duct 25. The fifth duct 55 and the third duct 56 also enter the bore 31 at axially spaced locations, the fifth duct 55 being located between the third and fourth ducts and the third duct 56 being located between the fifth and sixth ducts.

The axial extent of annulus 39 is such that it places ducts 24 and 53 in communication in both the first and second positions of the two position change-over valve 30. The axial extent of annulus 41 is such that in the first position of the two position change-over valve 30 it places third and fifth ducts 56 and 55 in communication, but when the two position change-over valve 30 is in the second position the annulus 41 communicates with third duct 56 only. The annulus 44 places the sixth duct 58 and duct 25 in communication when the change-over valve is in its first position. The annulus 43 in the first position of valve 30 communicates with a seventh duct 57 and in the second position of the valve 30 with ducts 25 and 58. The annulus 40 is spaced from annulus 41 such that when the two position change-over valve 30 is in the second position, the fifth duct 55 is in communication with the annulus 40 and hence through bores 48, 45 and 47 with annulus 39. When the two position change-over valve 30 is in the first position the fifth duct 55 communicates with the third duct 56 through annulus 41 (as mentioned above) and with bores 49, 46 and 50 and annulus 43. One way restrictor valves 64 and 65 are provided respectively in the fifth duct 55 and third duct 56.

When it is desired to steer the nose-wheels 105 through the pilot's manual steering control, a steering selector is operated which connects the first duct 28 to the source of high pressure fluid and the second duct 32 to drain. The pressure in the duct 28 is communicated to duct 29 and acts on the end of the two position change-over valve 30 acting as a hydraulic piston moving the two position change-over valve 30 to the second position as shown in FIGURE 1A. When this occurs the duct 29 will be in communication with a duct 60 to close the by-pass valves 68 and 71 as will be hereinafter described. Due to the fact that the two position change-over valve is in its second position, the stop valves 78 and 79 will be opened. This is the first position of the isolating valve means. If now the steering selector spool 13 is moved, say, in the left hand direction as shown in FIGURE 1 the annulus 27 will place the first duct 28 and hence the source of pressure fluid in communication with duct 24 and through annulus 39 to the fourth duct 53 leading to connection 62a of the cylinder 87 of the first piston and cylinder device 62. The connection 63b of the cylinder 96 of the second piston and cylinder device 63 will be also connected to the source of pressure fluid through fifth duct 55 via one way restrictor 64, through annulus 40, bores 48, 45 and 47, annulus 39, duct 24, annulus 27 and first duct 28. The connection 62b of cylinder 87 of the first piston and cylinder device 62 on the side of the piston of the first piston and cylinder device 62 remote from connection from 62a will be connected through third duct 56 incorporating one way restrictor 65, annulus 41, bores 49, 46 and 50, annulus 43, duct 25, annulus 23 and second duct 32 to drain. The connection 63a of the cylinder 96 of second piston and cylinder device on the side of the second piston and cylinder device 63 remote from connection 63b will also be connected to drain through sixth duct 58, annulus 43, duct 25, annulus 23 and second duct 32. The effect of this will be to cause the second piston and cylinder device 63 to remain solid and the first piston and cylinder device 62 to contract i.e. to move the arms 92 closer towards fixed arms 88 and thereby cause rotation of arms 92 on the first sleeve 93 in an anti-clockwise direction, the movement of these arms 92 being transmitted through arms 94 through the second piston and cylinder device 96 and arms 99 to second sleeve 100 and hence to the scissor linkage 103 and the nose-wheels 105.

Movement of the steering selector spool 13 in the right hand direction in FIGURE 1 will similarly connect duct 25 to the source of pressure fluid through annulus 27 and first duct 28, thereby putting connections 63a and 62b in communication with the source of pressure supply in the manner described in the preceding paragraph. Duct 24 and hence fourth duct 53 and fifth duct 55 will be put in communication with the drain through annulus 22, bores 20, 19 and 21 and annulus 23, the fourth and fifth ducts being connected to the duct 24 in the manner described in the preceding paragraph.

A follow-up control (not shown) of any suitable design is provided and acts to move the selector spool 13 to its neutral position as the selected steering angle is reached.

It will be understood that for the reasons hereinbefore described, should the nose-wheel assembly be displaced from the central position in the anti-clockwise direction and hence the arms 92 and 88 are closer to one another than the arms 94, 99 and the selector spool 13 displaced to rotate the nose-wheel assembly in the clockwise direction greater torque will be produced by the first piston and cylinder device 62 so that the arms 88 and 92 will take up their relative positions shown in FIGURE 1 before the arms 94 and 99 are moved closer together on contraction of the second piston and cylinder device 63.

A cross connection 69 joins the third and fourth ducts 56 and 53, leading into the third duct 56 intermediate the two position change-over valve 30 and the one way restrictor 65. A second one way restrictor 70 operating in the opposite direction from one way restrictor 65 is provided in the cross connection 69. A similar cross connection 66 joins fifth and sixth ducts 55 and 58 respectively, this cross connection 66 joining the fifth duct 55 intermediate the two position change-over valve 30 and the one way restrictor 64 and contains a one way restrictor 67 directed in the opposite direction to restrictor 64. The by-pass valves 71 and 68 are provided respectively in cross connections 69 and 66. These by-pass valves 71 and 68 seat respectively on valve seats 76 and 75 to shut off cross connections 69 and 66 respectively. The by-pass valves 71 and 68 are provided respectively with flat faces projecting through the valve seats and are stepped up to greater diameter parts 73 and 72. These enlarged portions form double-acting hydraulic pistons, the larger of which, when subjected to pressure tend to bias the by-pass valves on to their valve seats and the smaller of which tend to lift the by-pass valves from their valve seats. These pistons 73 and 72 are reciprocable in a chamber 74. This chamber 74 is connected to duct 60 previously mentioned through a duct 77. The area on which fluid pressure acts on the larger pistons is greater than the area of the valves projecting past valve seats 76 and 75 respectively, therefore, when the chamber 74 is subjected to the same pressure as is in fourth and sixth ducts 53 and 58 respectively the by-pass valves will be closed.

When the first duct 28 is connected to the source of pressure by the steering selector valve as previously described, the two position change-over valve 30 is moved from its first position as shown in FIGURE 1 to its second position as shown in FIGURE 1A. The duct 28 is thus in connection with duct 60 and through duct 77 with the chamber 74. The pressure acting on the larger pistons 73, 72 thus moves the by-pass valves into the position as shown in FIGURE 1, which is herein referred to as their first position and in which each by-pass valve shuts off its cross connection. When the force due to the pressure on the faces of the by-pass valves projecting past the valve seats and on the step pistons is greater than the force of the pressure acting on the larger pistons, the by-pass valves are moved towards each other from their valve seats into their second position in which the cross connections are open.

When it is desired to effect unsteered shimmy damping of the wheels 105 during the taxi-ing of the aircraft the steering selector is moved into its inoperative position and pressure is applied through a reducing valve (not shown) to a seventh duct 57. This pressure will be communicated through annulus 43, bores 50, 46 and 49, annulus 41 and respectively third and fifth ducts 56 and 55 to the step pistons of by-pass valves 71 and 68. As the first duct 28 is no longer in communication with the source of high pressure the two position change-over valve 30 moves into its first position. The chamber 74 will no longer be subjected to pressure from the ducts 60 and 77 and the by-pass valves 71 and 68 due to the pressure on the step pistons will be moved to their second positions. Also the linkage leading to the pilot's control valve will be disconnected when the steering selector is inoperative and thus the selector spool 13 will be moved to its central position as shown in FIGURE 1 by the centering spring 26, the lands 16 and 17 shutting off ducts 24 and 25. The stop valves 78 and 79 now shut off ducts 59 and 54 respectively as will be hereinafter described. The connections 62a and 62b on either side of the cylinder 87 of the first piston and cylinder device 62 are thus connected with each other through third duct 56, cross connection 69 and fourth duct 53 whilst the connections 63a and 63b of the cylinder 96 of the second piston and cylinder device 63 will be in connection with one another through fifth duct 55, cross connection 66 and sixth duct 58. The one way flow restrictors 65 and 70 between connections 62a and 62b and 64 and 67 between connections 63a and 63b will act to damp fluid flow. Thus when the wheels are subjected to shimmy about their straight ahead position, fluid can flow from one side to the other of the cylinders of each or both of the piston and cylinder devices 62 and 63. The reducing valve pressure is such that the pressure in the jacks due to shimmy damping plus the reducing valve pressure does not exceed the maximum pressure permissible in the components of the system.

An eighth duct 61 opens into the bore 31 in such a position that it is in communication with the annulus 42. The axial extent of annulus 42 is such that when the two position control valve 30 is in its first position an annulus 60a formed around bore 31 and in connection with duct 60 is in communication with the annulus 42. A further duct 85 is connected to the duct 60 through annulus 60a. Two further ducts 54 and 59 lead into the bore 31. The duct 54 enters the bore 31 in a position such that when the two position change-over valve 30 is in its first position, the duct 54 is in communication with annulus 40 and is shut off by land 33 when the change-over valve 30 is in its second position. The duct 59 enters the bore 31 in such a position that when the two position change-over valve 30 is in its first position the duct 59 is in communication with the annulus 44. These ducts 54, 59 join together to form a duct 86 which is in communication with second duct 32 and hence to drain. A pair of stop valves 78 and 79 are provided respectively in ducts 59 and 54. Stop valve 78 is movable to seat on valve seat 83 to shut off duct 59 and stop valve 79 is movable to seat on valve seat 84 to shut off duct 54. Stop valves 78 and 79 are mounted respectively on hydraulic pistons 80 and 81 which are reciprocable in a chamber 82. When the pressure in chamber 82 is increased due to the rise in pressure in duct 61 the stop valves 78 and 79 are moved off their seating.

When it is desired to retract the nose-wheel assembly it is necessary that the assembly should be centred. Accordingly when the retraction is about to be effected the eighth duct 61 is connected to the source of undercarriage retraction pressure. At the same time the steering selector is rendered inoperative so that the first duct is disconnected from the source of pressure fluid and the steering selector spool 13 is centralised. The two position change-over valve 30 will then be moved to its first position under the influence of spring 51. The pressure applied to the eighth duct, communicates via annulus 42 and duct 85 with the chamber 82 actuating the pistons 80 and 81 to move the stop valves 78 and 79 respectively off their valve seats 83 and 84. Pressure is also communicated to chamber 74 via annulus 42 and ducts 60 and 77 moving the by-pass valves into their first positions thereby shutting off the cross connections 69 and 66. At the same time the seventh duct 57 is connected to the low pressure source and is also connected to the third and fifth ducts 56 and 55 respectively of the first and second piston and cylinder devices 62, 63 through annulus 43, bores 50, 46, 49 and annulus 41. The fourth duct 53 is connected to drain through annulus 39, bores 47, 45, 48, annulus 40, duct 54, past shut off valve 79, and through ducts 86 and 32. The sixth duct 58 is connected to drain through annulus 44, duct 59, past stop valve 78, and through ducts 86 and 32. Thus the piston and cylinder devices 62 and 63 will be urged into their extended positions as shown in FIGURE 1, and hence the nose-wheel assembly will be in its central or straight ahead position.

It will be noted that when the nose-wheel is in the shimmy position and no pressure is applied through the eighth duct 61, the pressure in fourth duct 53 and sixth duct 58 will act on the shut off valves 79 and 78 respectively forcing them on to their valve seats 84 and 85, thus preventing the fluid from these ducts passing to drain.

Thus, for steering and shimmy damping, the hydraulic actuators operate in series, while for centering they operate in parallel.

Conventional hydraulic steering systems provide, at the best, a constant torque over their range of steering angle, this angle being limited usually to ±60 degrees, or thereabouts. Generally, the available torque falls as the angle increases, owing to geometrical changes, whereas the torque required to steer the aircraft normally increases as the severity of turn is increased. These conflicting characteristics compel the designer to provide adequate torque at the end of ram travel, giving excess torque towards the straight ahead position, and a mechanism which is therefore oversize and overweight for its application.

The control system hereinbefore described however provides wide angle steering and increasing steering torque with steering angle. In addition centering means, involving no additional ram pistons, cams or spring followers, and shimmy damping means automatically operative when steering is not used, are compactly integrated within the system.

It will be understood that the angular displacement of the system could be increased by using a further actuator or actuators and a corresponding number of intermediary members in a modified system, for example to give 360 degrees steering range.

I claim:

1. A mechanism having two jack means, the first of which is intended for moving an angularly displaceable device to one side of a mean position and the second of which is intended for moving the device to the other side of its mean position and having three coaxially mounted elements which connect the jacks to the device, one of the elements being angularly displaceable about its axis and being connected at spaced points off-set from its axis to the angularly displaceable device and pivotally to one of the relatively movable parts of the first jack means, a second of the elements being angularly displaceable about its axis and being pivotally connected at spaced points off-set from its axis to the other of the relatively movable parts of the first jack means and to one of the relatively movable parts of the second jack means, the third element being fixed and being pivotally connected at a point off-set from its axis to the other of the relatively movable parts of the second jack means, and the first and second jack means having the axes of their movable parts tangential to the same or different circles, coaxial with the axis of the three elements and, when the angularly displaceable device is in its mean position, being in their extended position.

2. A mechanism as claimed in claim 1 in which both jack means are double-acting hydraulic piston and cylinder jacks.

3. A mechanism as claimed in claim 2, and control means therefor comprising a first duct adapted to be connected with a source of fluid pressure, a second duct adapted to be connected with a drain source, a third duct connected to one end of the cylinder of said first jack means, a fourth duct connected to the other end of the cylinder of said first jack means, a fifth duct connected to one end of the cylinder of said second jack means, a sixth duct connected to the other end of the cylinder of said second jack means, and control valve means between said first and second ducts on the one hand and said third, fourth, fifth and sixth ducts on the other hand, which control valve means is movable between two positions in one of which it permits connection between said first duct and said third and sixth ducts and between said second duct and said fourth and fifth ducts and in the other of which it permits connection between said first duct and said fourth and fifth ducts and between said second duct and said third and sixth ducts; the arrangement being such that when the pressure in said third and sixth ducts exceeds the pressure in said fourth and fifth ducts, said first jack means tends to move said one element around said third element in the same direction as said second jack means tends to move said second element around said one element.

4. A mechanism as claimed in claim 3, wherein the control means further comprises a first cross connection between said third duct and said fourth duct, a second cross connection between said fifth duct and said sixth duct, a pair of fluid flow restriction means one in each of said cross connections, and isolating valve means movable between a first position in which it closes both said cross connections and permits said first and second ducts to be connected through said control valve means with said third, fourth, fifth and sixth ducts and a second position in which it opens said cross connection and isolates said first and second ducts from said third, fourth, fifth and sixth ducts.

5. A mechanism as claimed in claim 4, wherein each of said restriction means comprises a pair of one-way flow restrictors spaced apart along the cross connection and arranged each to restrict flow towards the other, and said control means further comprises a seventh duct adapted to be connected to a source of fluid pressure and connected through said isolating valve means with both said cross connections between the one way flow restrictors, the arrangement being such that when said isolating valve means is in its first position said seventh duct is isolated from said cross connections and when said isolating valve means is in its second position said seventh duct is in fluid communication with said cross connections.

6. A mechanism as claimed in claim 3, wherein the control means comprises an eighth duct adapted to be connected to a source of fluid pressure and connected through said isolating valve means with said third and fifth ducts, said isolating valve means being movable to a position in which said eighth duct is in fluid communication with said third and fifth ducts and said second duct is in communication with said fourth and sixth ducts.

7. A mechanism as claimed in claim 6, wherein the isolating valve means comprises a two-position change-over valve, a pressure operated device connected to said change-over valve to move it from a first position to a second position and connected to be operated by pressure in said first duct, and biasing means biasing said change-over valve to its first position, the arrangement being such that said change-over valve in its second position connects said control valve means with said third, fourth, fifth and sixth ducts.

8. A mecchanism as claimed in claim 7, wherein the isolating valve means further comprises a pair of by-pass valves one in each of said cross connections and movable between first positions in which each shuts off its cross connection and second positions in which each opens its cross connection, by-pass pressure operated means connected with said by-pass valves to move said by-pass valves from their second positions to their first positions and connected with said change-over valve, the arrangement being such that when said change-over valve is in its first position said by-pass pressure-operated means is connected with said eighth conduit and when said change-over valve is in its second position said by-pass pressure-operated means is connected with said first conduit.

9. A mechanism as claimed in claim 8, wherein the isolating valve means also comprises drain ducting leading from said second duct to said change-over valve and put in fluid communication with said fourth and sixth ducts when said change-over valve is in its first position, stop valve means in said drain ducting urged towards closure by fluid pressure in said fourth and sixth conduit, a further pressure operated means connected to said stop valve means to move said stop valve means to open position and in fluid connection through said change-over valve when it is in its first position with said eighth conduit.

10. A mechanism as claimed in claim 1 in which the angularly displaceable device is an axle for receiving a wheel and the fixed one of the three coaxially mounted elements is the support for the axle and with respect to which the axle can move.

11. An aircraft supporting leg having a wheel which is angularly displaceable to one side or to the other side of a mean position for the purpose of steering the aircraft, and having a mechanism as claimed in claim 10.

References Cited in the file of this patent
UNITED STATES PATENTS 2,650,782  Fehring _____ Sept. 1, 1953
2,856,138  Hogan _____ Oct. 14, 1958